April 15, 1952   A. E. BENTEMAN   2,593,247
COUPLING PIN LOCK FOR TRAILER HITCHES
Filed Oct. 10, 1950
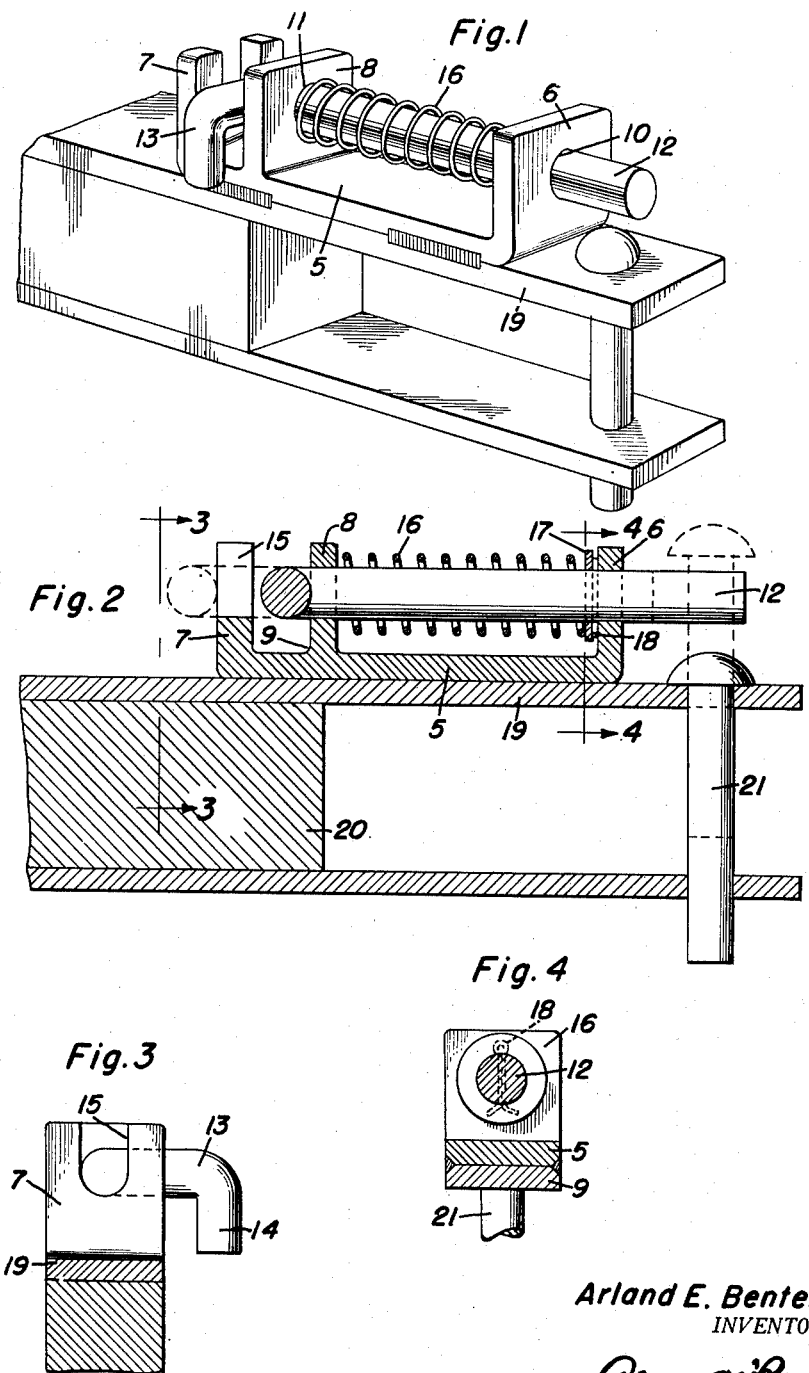
Arland E. Benteman
INVENTOR.
BY Patented Apr. 15, 1952

2,593,247

UNITED STATES PATENT OFFICE 2,593,247

COUPLING PIN LOCK FOR TRAILER HITCHES

Arland E. Benteman, Randolph, Kans.

Application October 10, 1950, Serial No. 189,430

1 Claim. (Cl. 280—33.15)

The present invention relates to new and useful improvements in trailer hitches, and more particularly to a lock for the coupling pin of the hitch.

An important object of the invention is to provide a sliding lock mounted on the tongue of a trailer or implement for movement into and out of position overlying the coupling pin to lock the pin from becoming accidentally withdrawn, to thus insure the safe coupling of the trailer with a towing vehicle.

Another object of the invention is to provide the sliding locking pin with a laterally projected weighted handle to automatically lock the locking pin in a pocket forming part of the mounting for the locking pin and also to provide a spring-projected locking pin to also further aid in holding the latter in either its locking or unlocking position.

A still further object is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is a longitudinal sectional view; and

Figures 3 and 4 are transverse sectional views taken respectively on the lines 3—3 and 4—4 of Figure 2.

Referring now to the drawing in detail wherein, for the purpose of illustration, I have disclosed a preferred embodiment of the invention, the numeral 5 designates a mounting preferably constructed of strap metal and formed at its ends with an upstanding front guide 6 and an upstanding rear guide 7. An intermediate guide lug 8 is cast, welded, or otherwise suitably secured to mounting 5 forwardly of rear guide 7 to form a pocket 9 therebetween.

Front guide 6 and intermediate guide lug 8 are formed with aligned openings 10 and 11 slidably receiving a locking pin 11 and the rear end of locking pin 12 is formed with a laterally projecting handle 13 having a weighted outer end 14, the handle 13 being adapted to enter the pocket 9 between rear guide 7 and guide lug 8.

Rear guide 7 is formed with a guide notch 15 in its upper edge aligned with openings 10 and 11 to slidably receive locking pin 12 during a retracting movement of the latter to place handle 13 behind rear guide 7.

Locking pin 12 is held in a projected position by a coil spring 16 placed on the locking pin between guide lug 8 and a washer 17 held on the locking pin by a cotter pin, or the like, 18 positioned behind the front guide 6.

In the operation of the device, the mounting 5 is welded or otherwise suitably secured on the upper plate 19 which projects from a tongue 20 to receive a coupling pin 21 for coupling the tongue to a trailer hitch (not shown). Mounting 5 is positioned so that with locking pin 12 in its forwardly projected position, the front end of the locking pin will overlie the upper end of coupling pin 21, to thus lock the coupling pin from removal, in the manner as shown by the full lines in Figure 2 of the drawing.

Locking pin 12 is projected or retracted by swinging handle 13 upwardly and after sliding the locking pin 12 forwardly into its retracted or locking position, the handle 13 is turned downwardly to enter the pocket 9, to thus hold the locking pin from retracting movement. The weighted end 14 of the handle, as well as the spring 16, aid in holding the handle 13 in the pocket 9.

The locking pin is retracted by swinging handle 13 upwardly and sliding the handle and locking pin rearwardly so that the handle passes through the notch 15 of rear guide 7 and the handle is then turned downwardly behind the rear guide 7, as shown by dotted lines in Figure 2, to thus hold the locking pin in its retracted or unlocked position.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A coupling pin lock for trailer hitches comprising a mounting adapted for attaching to a trailer tongue, upstanding guides at front and rear ends of the mounting, said front guide having an opening and said rear guide having a slot in its upper edge, an intermediate guide lug on the mounting forwardly of the rear guide to form a pocket therebetween, said intermediate guide lug having an opening, a locking pin slidable and rotatable in said openings of the front and intermediate guides, spring means between the front and intermediate guides and engaging the locking pin to project the latter forwardly into a position overlying a coupling pin at the front end of the tongue, and a handle projecting laterally at the rear end of the locking pin and swingable downwardly into said pocket to hold the locking pin in a forwardly projecting locking position, and said handle being movable rearwardly through said slot into a position behind the rear guide to hold the locking pin in its retracted unlocked position.

ARLAND E. BENTEMAN.

REFERENCES CITED

The following references are of record in the file of this patent:

UNITED STATES PATENTS

| Number | Name | Date |
|---|---|---|
| 489,272 | Smith | Jan. 3, 1893 |
| 836,463 | Rapson | Nov. 20, 1906 |
| 2,216,553 | Greene et al. | Oct. 1, 1940 |

FOREIGN PATENTS

| Number | Country | Date |
|---|---|---|
| 3,776 | Great Britain | 1890 |